United States Patent [19]

Miyaoka

[11] 3,941,410

[45] Mar. 2, 1976

[54] PIPE JOINT CONSTRUCTION

[76] Inventor: Tadashi Miyaoka, 7-31, Horikiri-cho, Nishinomiya, Hyogo, Japan

[22] Filed: Oct. 10, 1974

[21] Appl. No.: 513,569

[52] U.S. Cl. ............... 285/321; 285/342; 285/404
[51] Int. Cl.² ......................................... F16L 21/04
[58] Field of Search ............ 285/321, 342, 404, 416

[56] References Cited
UNITED STATES PATENTS

| | | | |
|---|---|---|---|
| 2,440,452 | 4/1948 | Smith | 285/321 X |
| 2,521,127 | 9/1950 | Price | 285/321 X |
| 2,741,497 | 4/1956 | Risley | 285/342 |
| 2,986,409 | 5/1961 | Weber | 285/321 X |
| 3,345,087 | 10/1967 | Hanes et al. | 285/321 X |
| 3,433,504 | 3/1969 | Hanes | 285/321 X |
| 3,489,439 | 1/1970 | Word | 285/404 X |
| 3,606,393 | 9/1971 | Huntsinger et al. | 285/321 X |
| 3,844,589 | 10/1974 | Bram | 285/416 X |

FOREIGN PATENTS OR APPLICATIONS

| | | | |
|---|---|---|---|
| 1,184,658 | 2/1959 | France | 285/321 |
| 12,788 | 9/1970 | Japan | 285/321 |

*Primary Examiner*—Thomas F. Callaghan
*Attorney, Agent, or Firm*—Farley, Forster and Farley

[57] ABSTRACT

A sealed, vibration resistant, non-separating joint construction connects the plug end of one pipe to the socket end of another pipe. A split lock ring, recessed in an internal groove in the the plug end before insertion of the plug into the socket, is then contracted and extended from the groove into engagement with the outer surface of the plug by set screws on the socket spaced circumferentially around the groove. The contracted lock ring centers the plug in the socket and axially overlaps a radially projecting shoulder or step surface on the plug to prevent axial separation. A sealing member is pressed axially into the annular space between the inner surface of the socket, the outer surface of the plug, and the outer lateral surface of a back-up ring covering the outer lateral surface of the lock ring.

4 Claims, 4 Drawing Figures

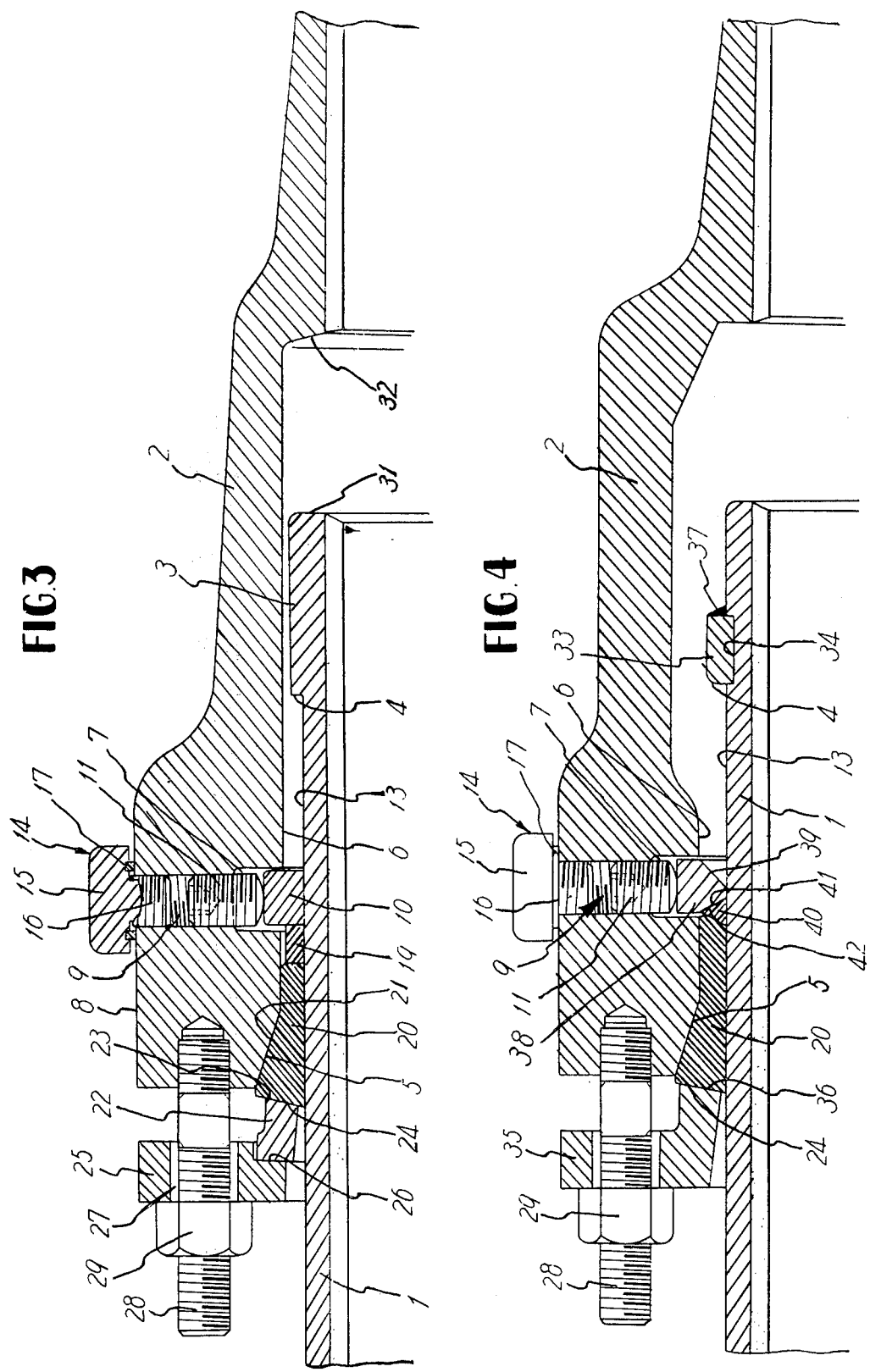

PIPE JOINT CONSTRUCTION

SUMMARY OF THE INVENTION

The present invention relates to a pipe joint construction wherein the plug portion of one pipe is inserted in the socket portion of the other pipe and a sealing member is pressed into an annular space between the socket and plug portions. A principal object of the invention is to provide a pipe joint construction which has a vibration resistant effect, which is easy to assemble and which prevents the plug from slipping off the socket.

A pipe joint construction according to the present invention comprises an annular groove formed circumferentially in the inner peripheral surface of said socket portion and spaced inwardly from the axially outer end thereof, a plurality of circumferentially spaced threaded openings extending radially between the bottom of said annular groove and the outer peripheral surface of the socket portion, a split lock ring fitted in said annular groove, screw means engaged in said threaded openings to urge said lock ring against the elasticity thereof toward the pipe axis and to decrease the lock ring diameter, a step surface extending radially outwardly from the outer peripheral surface of said plug portion and adapted to be disposed axially inwardly of the socket portion from the lock ring position, the arrangement being such that when said lock ring is decreased in diameter by said screw means so that the inner periphery of the lock ring projects from the annular groove, said step surface of the plug portion can engage the inner lateral surface of said lock ring to limit axial separating movement between the pipes, a sealing member, and means for compressing the sealing member into an annular space bounded by the inner surface of the socket portion, the outer lateral surface of the lock ring and the outer surface of the plug portion.

According to such arrangement of the present invention, the split lock ring is decreased in diameter in advance against the elasticity thereof and is then inserted in the socket portion and the elastic restoring force of the lock ring causes it to expand and sink into the inner peripheral annular groove. In such conditions, the plug portion is inserted in the socket portion so that the separation preventing step surface thereof may be positioned inwardly of said lock ring, whereupon the screw means are screwed into the threaded openings around the socket portion to urge said lock ring toward the pipe axis, causing the inner periphery of the lock ring to project from the annular groove and bear against the outer peripheral surface of the plug portion. As a result, radial play between the socket and plug portions is eliminated and separation of the plug portion from the socket portion is reliably prevented by axial abutment between the step surface of the plug portion and the inner lateral surface of the lock ring.

Further, in the pipe joint construction described above, a sealing member is pressed into a space between the inner peripheral surface of the socket portion and the outer peripheral surface of the plug portion at a position outwardly of said lock ring, thereby liquid-sealing the pipe joint. A liquid flowing in the pipeline can flow into the annular groove in which the lock ring is fitted, and in the case where the liquid pressure in the pipeline is high, there is the danger of the liquid readily leaking to the outside through clearances between said screw means and threaded openings.

Therefore, it is also necessary to liquid-seal the threaded openings. However, simply placing a liquid-sealing washer between the enlarged head of a conventional screw and the outer peripheral surface of the socket portion would be inadequate, since in order to achieve a proper sealing effect by means of such sealing washers, it would be necessary to drive such screws into the threaded openings until their heads compress the sealing washers to a suitable degree. Therefore, when priority is to be given to the sealing effect, it would be impossible to adjust the amount of pushing-out of the lock ring to be effected by such screws.

If there is a dimensional error in the thickness of the socket portion, since the length of the screw is constant, the lock ring would be pushed out in a greater amount than the predetermined value where the socket wall is thinner, whereas where the socket wall is thicker, the amount of pushing-out of the lock ring would be insufficient. As a result, the outer peripheral surface of the plug would become eccentric with respect to the inner peripheral surface of the socket, so that the size of the annular space between these two surfaces changes circumferentially. Since the sealing member is pressed into said annular space, as described above, the sealing effect will be decreased at the wider regions of said space. Further, in the regions where the socket wall is thinner, depending upon the dimensional errors of wall thickness, there may be cases where the screws cannot be tightened until the sealing washers at the screw heads are compressed. In such cases, the sealing effect, of course, cannot be expected. Conversely, when the amount of pushing-out of the lock ring is insufficient where the socket wall is thicker, the engagement between the inner periphery of the lock ring and the separation preventing step surface of the plug would become insufficient.

Further, even if the wall thickness of the socket is constant, there may be cases where there are dimensional errors in the diameters of the socket and plug. In such cases, if the amount of pushing-out of the lock ring cannot be adjusted, the lock ring would be pressed against the outer peripheral surface of the plug too strongly to permit relative axial movement between the socket and plug, with the result that the intended vibration preventive effect is not achieved or that the sealing washers at the screw heads are not highly compressed, failing to achieve a sufficient sealing effect. If, the clearance between the lock ring and the outer peripheral surface of the plug becomes too large, insufficient engagement between the lock ring and the step surface, or eccentric movement to a degree beyond allowable limits becomes possible, causing the danger of joint separation or of the sealing effect being decreased.

Another object of the present invention is to provide a pipe joint construction wherein the sealing of threaded openings into which lock ring screw means are screwed can be achieved and the amount of pushing-out of a lock ring can be freely adjusted.

Thus, according to the present invention, said screw means is divided into a screw having no enlarged head and adapted to be sunk completely in a threaded opening and a headed screw adapted to be screwed into the inlet portion of said threaded opening for the sealing thereof.

According to such arrangement of the invention, the amount of pushing-out of the lock ring can be optionally determined by the depth to which the headless screws are driven so that the annular space between the socket and plug into which the sealing member is pressed may be substantially constant in width with respect the circumferential direction, and so that the lock ring may bear against the outer peripheral surface of the plug to a suitable degree; and, the sealing of the threaded opening is effected by the sealing screws thereby establishing a satisfactory vibration resistant pipe joint condition free from the above described disadvantages.

Other features and advantages of the present invention will be readily understood from the preferred embodiments of the invention to be described with reference to the accompanying drawings.

DESCRIPTION OF THE DRAWINGS

FIG. 3 is a side view in longitudinal section showing the components of FIG. 1 in their assembled relation; and FIG. 4 is a side view in longitudinal section showing a modified joint construction of the invention.

DESCRIPTION OF THE PREFERRED EMBODIMENTS

Figures 1, 2:
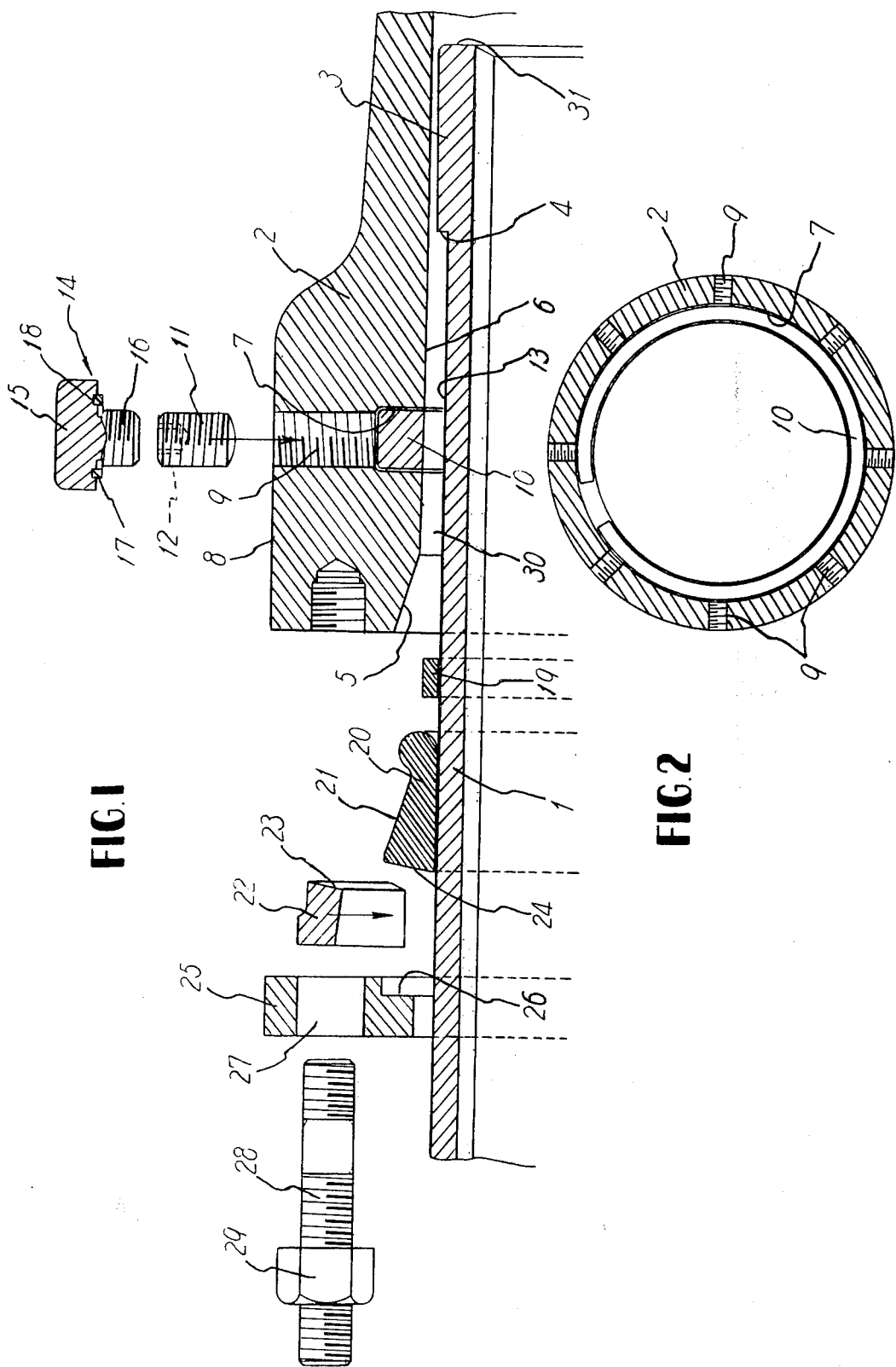
FIG. 1 is a side view in longitudinal section showing the joint construction with the components in exploded relation.
FIG. 2 is a cross-sectional view of the socket portion of the joint showing a lock ring fitted therein.

In FIGS. 1 through 3, the character 1 designates a pipe plug portion and the character 2 designates a pipe socket portion. The outer periphery of the end of the plug portion 1 is provided with a projection 3 of enlarged diameter to define a separation - preventing step surface 4 extending radially of the pipe axis.

The open end 5 of the inner peripheral surface of the socket portion 2 is outwardly tapered, and the inner peripheral surface 6 of the socket is provided with a circumferential annular groove 7 disposed at a suitable distance inwardly from the tapered open end 5. A plurality of circumferentially equispaced threaded openings 9 extend radially between the bottom of the annular groove 7 and the outer peripheral surface 8 of the socket portion 2.

The character 10 designates a lock ring split or cut through at one point so as to be variable in diameter, the size of the cross-section thereof being such that it can just be received in said annular groove 7. Thus, by inserting the lock ring in the socket 2 with the diameter decreased against the elasticity thereof, the lock ring can be fitted in the annular groove 7 by the expanding action as it springs back.

The character 11 designates a screw having no enlarged head, adapted to be screwed into a threaded opening 9, and provided at one end with a hexagonal opening 12 for receiving a driver. The length of the screw 11 is such that when it pushes out the lock ring 10 until the latter bears against the outer peripheral surface 13 of the plug 1, the screw has been driven to an intermediate position within the threaded opening 9. The character 14 designates a screw, for sealing the threaded opening 9, provided with an enlarged head 15, and with a sealing member 17 on the bottom surface of the enlarged head 15 to surround the shank 16, which is adapted to be screwed shallowly into the inlet portion of the threaded opening 9 to an extent such that the screw 14 will not readily come off.

The character 19 designates a backup ring for protecting an annular sealing member. By expanding the backup ring against the elasticity thereof, it can be fitted over the outer peripheral surface 13 of the plug beyond the enlarged projection 3.

The character 20 designates an annular sealing member for liquid sealing the joint between the socket and the plug. It has a substantially wedge-shaped cross-section having a tapered portion 21 adapted to bear against the tapered open end 5 of the socket 2. By expanding the sealing member against the elasticity thereof, it can be fitted over the outer peripheral surface 13 of the plug beyond the enlarged projection 3.

The character 22 designates an intermediate ring circumferentially divided into a plurality of segments, the size of one end surface 23 thereof being such that it is adapted to bear against substantially the entire area of the outer end surface 24 of the annular sealing member 20.

The character 25 designates a pusher ring having an internal diameter of a size allowing the pusher ring to pass over the enlarged projection 3. One inner edge of the pusher ring is provided with a recess 26 adapted to be fitted over the intermediate ring 22 to backup the latter. The pusher ring is also provided with a plurality of circumferentially equispaced openings 27 each receiving a stud 28 which passes through the opening 27, is screwed into a threaded hole the end surface of the socket 2, and has a nut 29 screwed thereover to draw the pusher ring 25 toward the socket 2.

The assembling procedure will now be described.

As shown in FIG. 1, the pusher ring 25, annular sealing member 20 and backup ring 19 are fitted in the order mentioned over the plug 1 in the manner described above, and the lock ring 10 is fitted in the annular groove 7 of the socket. The plug 1 is then inserted in the socket 2 in such a manner that the enlarged projection 3 is positioned inwardly of the annular groove 7, whereupon the screws 11 are screwed into the threaded openings 9 to urge the lock ring 10 toward the center of the socket to decrease the diameter of the lock ring, thereby pushing out the inner peripheral portion of the lock ring 10 from the annular groove 7 until it bears against the outer peripheral surface 13 of the plug. At this time, as described above, the amount of pushing-out of the lock ring effected by the screws 11 is adjusted so that an annular space 30 between the inner peripheral surface 6 of the socket and the outer peripheral surface 13 of the plug may have a substantially uniform circumferential width and so that the lock ring 10 may bear against the outer peripheral surface 13 of the plug with a substantially uniform suitable circumferential force.

Thereafter, the sealing screws 14 are screwed into the inlet portions of the threaded openings 9 so that the sealing members 17 may be compressed to a suitable degree between the enlarged heads 15 and the outer peripheral surface 8 of the socket, thereby sealing the threaded openings 9. At this time, it is desirable that a suitable space be left between the outer end of each screw 11 and the inner end of the associated sealing screw 14, as shown in FIG. 3.

Subsequently, the backup ring 19 and annular sealing member 20 on the outer surface 13 of the plug are slid axially into the socket 2, and the complementary segments of the intermediate ring 22 are interposed between the annular sealing member 20 and the pusher ring 25 in an endless ring fashion, whereupon the nuts 29 are successively tightened to move the pusher ring 25 toward the socket 2. As a result, as shown in FIG. 3, the annular sealing member 20 of substantially wedge-shaped cross-section is compressed into an annular space defined by the tapered open end 5 of the socket 2, the outer peripheral surface 13 of the plug, and the backup ring 19 bearing against the outer lateral surface of the lock ring 10. Thus, the annular sealing member liquid-seals the space between the plug and the socket.

In addition, in the arrangement shown in FIG. 3, the plug 1 is axially movable relative to the socket 2 between a first position where the front end 31 of the plug bears against the inner end surface 32 of the socket 2 and a second position where the step surface 4 bears against the inner lateral surface of the lock ring 10.

Alternatively, as shown in FIG. 4, the step surface 4 may be formed by a split ring 33 fitted in a circumferential shallow annular groove 34 provided in the outer peripheral surface 13 of the plug and welded to the latter surface 13. Since the ring 33 can be fixed in position after the pusher ring 35 is fitted over the plug 1, it is possible to provide the pusher ring 35 with a pusher end surface 36 for engaging the outer end surface 24 of the annular sealing member 20, without the need to use the segmented intermediate ring 22.

The welding place 37 of the ring 33 is located desirably at the lateral surface of the ring 33 opposite to the step surface 4 thereof in order not to give an adverse effect on the engagement between the lock ring 38 and the step surface 4. However, when the step surface 4 and the lock ring 38 push against each other, it is necessary to ensure that the ring 33 will not be subjected to a force tending to lift it at the side where the step surface 4 exists. To this end, the inner lateral surface 39 of the lock ring 38 is inwardly inclined so that when said surface 39 and the step surface 4 push against each other, the ring 33 is urged into the annular groove 34. Of course, it is desirable that the step surface 4 be in the convex form as shown.

In addition, as shown in FIG. 4, the bearing surface 41 of a backup ring 40 opposed to the lock ring 38 and the bearing surface 42 of the lock ring 38 opposed to the backup ring 40 are inclined in the opposite direction to that of the surface 39 so that when the lock ring 38 and the backup ring 40 push against each other, the backup ring 40 may not be lifted from the outer peripheral surface 13 of the plug.

I claim:

1. A joint construction between the plug portion of one pipe and the socket portion of another pipe, said plug portion having a front end surface, an outer cylindrical surface and a step surface extending radially outwardly from said outer cylindrical surface at a first axial distance from said end surface;
   said step surface of the plug portion being provided by a projecting ring having its inner peripheral portion fitted in an annular groove circumferentially formed in the outer cylindrical surface of the plug portion, said projecting ring being welded to the outer cylindrical surface of the plug portion only at the side facing said end surface, the lateral surface of said projecting ring at the non-welded side serving as said step surface of the plug portion;
   said socket portion having an axially inner end surface opposed to said front end surface of the plug portion, an annular groove formed circumferentially in the inner peripheral surface of said socket portion;
   a split lock ring fitted in said annular groove and having an inner lateral surface opposed to said step surface, said inner lateral surface being spaced axially from said inner end surface of the socket portion by a second axial distance which is greater than said first axial distance, and said inner lateral surface being inclined so as to have a radially inward wedging action on said projecting ring;
   a plurality of circumferentially spaced threaded opening extending radially between the bottom of said annular groove and the outer peripheral surface of the socket portion;
   screw means engaged in said threaded openings to urge said lock ring against the elasticity thereof toward the pipe axis and decrease the lock ring diameter, the arrangement being such that when said lock ring is decreased in diameter by said screw means so that the inner periphery of the lock ring projects from said annular groove and engages said outer cylindrical surface of the plug portion, said step surface of the plug portion overlaps the inner lateral surface of said lock ring to limit axial movement between the pipes by the difference between said second and first axial distances; and,
   a sealing member, and means for compressing the sealing member into an annular space bounded by the inner surface of the socket portion, the outer lateral surface of the lock ring and the outer cylindrical surface of the plug portion.

2. A pipe joint construction as set forth in claim 1 characterized in that each of said screw means is divided into a headless screw adapted to be sunk completely in one of said threaded openings to decrease the lock ring diameter, and a sealing screw adapted to be screwed into the inlet portion of the threaded opening to seal said threaded opening.

3. A pipe joint construction as set forth in claim 2, wherein said sealing screw is provided with an enlarged head and a sealing member is interposed between said enlarged head and the outer peripheral surface of the socket portion.

4. A joint construction between the plug portion of one pipe and the socket portion of another pipe, said plug portion having a front end surface, an outer cylindrical surface and a step surface extending radially outwardly from said outer cylindrical surface at a first axial distance from said end surface;
   said socket portion having an axially inner end surface opposed to said front end surface of the plug portion, an annular groove formed circumferentially in the inner peripheral surface of said socket portion;
   a split lock ring fitted in said annular groove and having an inner lateral surface opposed to said step surface, said inner lateral surface being spaced axially from said inner end surface of the socket portion by a second axial distance which is greater than said first axial distance;
   a plurality of circumferentially spaced threaded openings extending radially between the bottom of said annular groove and the outer peripheral surface of the socket portion;
   screw means engaged in said threaded openings to urge said lock ring against the elasticity thereof toward the pipe axis and decrease the lock ring diameter, the arrangement being such that when said lock ring is decreased in diameter by said screw means so that the inner periphery of the lock ring projects from said annular groove and engages said outer cylindrical surface of the plug portion, said step surface of the plug portion overlaps the inner lateral surface of said lock ring to limit axial movement between the pipes by the difference between said second and first axial distances; and, a sealing member, a backup ring positioned between the sealing member and the lock ring and fitted over the plug portion so as to cover the split the region of the lock ring, and means for compressing the sealing member into an annular space bounded by an inner surface of the socket portion, the outer lateral surface of the backup ring and the outer cylindrical surface of the plug portion, the surfaces of said backup ring and lock ring which face each other being inclined in such a manner that the reaction force resulting from the action of said compressing means urges the backup ring against the outer cylindrical surface of the plug portion.

* * * * *